(12) United States Patent
Hino et al.

(10) Patent No.: US 7,603,840 B2
(45) Date of Patent: Oct. 20, 2009

(54) LNG POWER PLANT

(75) Inventors: Shiro Hino, Yokohama (JP); Shunji Nakagawa, Niiza (JP); Hiroshi Tsuji, Tokyo (JP); Shigeru Misumi, Kawaguchi (JP); Yoichi Sugimori, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 536 days.

(21) Appl. No.: 11/357,980

(22) Filed: Feb. 22, 2006

(65) Prior Publication Data

US 2006/0185367 A1 Aug. 24, 2006

(30) Foreign Application Priority Data

Feb. 23, 2005 (JP) ............... 2005-046915

(51) Int. Cl.
*F02C 3/22* (2006.01)
(52) U.S. Cl. ..................... 60/39.465; 60/736
(58) Field of Classification Search ............ 60/39.281, 60/39.465, 734, 736
See application file for complete search history.

(56) References Cited

U.S. PATENT DOCUMENTS 3,720,057 A * 3/1973 Arenson ............ 60/772
5,899,073 A * 5/1999 Akimaru ............ 60/736
7,047,747 B2 5/2006 Tanaka

FOREIGN PATENT DOCUMENTS

| CN | 1419043 A | 5/2003 |
|----|-----------|--------|
| JP | 02-240499 A | 9/1990 |
| JP | 2001-124295 A | 5/2001 |
| JP | 3214709 B2 | 7/2001 |
| JP | 2002-115564 A | 4/2002 |
| JP | 2002-188460 A | 7/2002 |
| JP | 2003-049718 A | 2/2003 |

* cited by examiner

*Primary Examiner*—Louis J Casaregola
(74) *Attorney, Agent, or Firm*—Foley & Lardner LLP

(57) ABSTRACT

An LNG (liquefied natural gas) power plant has a heating/cooling device. The heating/cooling device is controlled by a command generated by a temperature control device. The temperature control device receives a heating value and a temperature of the fuel gas. The heating value of the fuel gas introduced to a gas turbine power generation unit from an LNG vaporization facility is detected by a heating value detector. The temperature of the fuel gas is detected by a temperature detector. A target temperature calculator installed in the temperature control device calculates a target temperature based on the heating value. A command generator installed in the temperature control device generates the command by comparing the target temperature and the fuel temperature.

8 Claims, 7 Drawing Sheets

LNG POWER PLANT

CROSS REFERENCE TO RELATED APPLICATION

This application is based upon and claims the benefit of priority from the prior Japanese Patent Application No. 2005-046915, filed on Feb. 23, 2005; the entire content of which is incorporated herein by reference.

BACKGROUND OF THE INVENTION

The present invention relates to an LNG power plant which uses liquefied natural gas (LNG) as fuel, and an operation method of the LNG power plant.

A general gas turbine power generation facility has a combustor. The combustor mixes fuel with compressed air, and burns the fuel to generate high-temperature and high-pressure combustion gas. This combustion gas is introduced into a gas turbine to rotate a rotor. Rotation energy of the rotor is transmitted to a power generator to generate electric power.

Liquefied natural gas (LNG) widely known as clean energy source is often used as the fuel introduced into the combustor. An LNG vaporization facility vaporizes LNG as fuel gas.

In a gas turbine power plant, an LNG vaporization facility and a gas turbine power generation facility are often constructed separately. Therefore, there is no linked operation between both facilities, and they are operated individually. For example, Japanese Patent No. 3214709, Japanese Patent Application Publication Hei 2-240499, Japanese Patent Application Publication 2001-124295, Japanese Patent Application Publication 2002-115564, Japanese Patent Application Publication 2002-188460 and Japanese Patent Application Publication 2003-49718 describe control devices and methods of the LNG vaporization facility, but those documents do not disclose control devices or methods of the power generation facility.

A compact power plant constructed recently has an LNG vaporization facility adjacent to a power generation facility.

The compact power plant has a thermally insulated LNG storage tank installed in the LNG vaporization facility. A boost pump pressurizes LNG stored in the LNG storage tank, and sends the LNG to a vaporizer. The vaporizer vaporizes the LNG.

Even if the LNG storage tank is insulated, heat entry into the LNG storage tank is inevitable. Hence, a slight quantity of gas constantly vaporizes from the stored LNG. This gas is called a boil off gas (BOG).

The BOG generated in the LNG storage tank is discharged through a BOG outlet valve. The BOG discharged from other LNG storage tanks is collected together and is pressurized by a BOG compressor. Thereafter, the BOG is mixed with the LNG outputted from the vaporizer by a gas feed pipe, and fed to the power generation facility.

Most of LNG used in Japan is imported and the characteristics of LNG vary depending on the origin of the LNG. So, the compositions of the LNG stored in different LNG storage tanks may differ from each other. This difference causes a difference in heating values.

Therefore, the power generation facility is equipped with a calorimeter or gas chromatography on the gas feed pipe to detect or calculate a heating value of the gas and control the gas flow rate of the LNG vaporization facility to keep the heating value of the gas in a small range.

In addition, the power generation facility is equipped with a gas heating/cooling device on the gas feed pipe connected to a fuel adjust valve. Temperature of the gas at the outlet of the gas heating/cooling device is measured and its signal is sent to the gas heating/cooling device. The gas heating/cooling device controls the temperature of the fuel gas to keep the temperature of the fuel gas introduced into the gas turbine appropriate.

In a power generation plant in which the LNG vaporization facility and the power generation facility are constructed adjacent to each other to be compact, there may not be enough space to install a processing device for generation of the BOG in the LNG vaporization facility.

A quantity of BOG varies over a very wide range. For example, when receiving LNG, a large quantity of BOG is generated. During winter when the air temperature is low, BOG quantity is smaller.

Therefore, based on a pressure of a LNG storage tank, devices, such as a BOG outlet valve and a BOG compressor, control BOG flow rate to prevent excessive pressure rise in the LNG storage tank. As a result, the change in the BOG generation rate influences the gas turbine of the power generation facility directly.

A gas turbine has a limit about a fuel. This limitation is about a value called a Wobbe Index (a function of heating value, specific gravity of fuel and combustion temperature) expressed by the expression (1).

$$\text{Wobbe Index} = \frac{LHV}{\sqrt{\frac{Mwgas}{28.96} \times Tgas}} \qquad (1)$$

where
  LHV: Lower Heating Value
  Mwgas: molecular weight of the fuel gas
  Tgas: absolute temperature of the fuel gas (degree Rankine)

Heating value of BOG is different from the heating value of LNG. Therefore, as BOG flow rate changes, characteristics of the fuel quality changes rapidly. Consequently, calorie of the fuel flowing into the gas turbine of the power generation facility varies.

If calorie of fuel varies frequently, the calorie may not remain within a limitation range of the Wobbe Index (e.g., ±5%). Therefore, it is necessary to add facilities such as a flare facility which externally burns the BOG and/or a tank which adjusts the flow rate of a fuel gas in the middle of the gas feed pipe. In addition, if the mixture rate of the BOG in the fuel gas rises close to 100%, it is difficult to operate the gas turbine.

If the index of the fuel index deviates from the limitation range even after taking these countermeasures, operation of the power plant has to be stopped.

BRIEF SUMMARY OF THE INVENTION

The present invention has been made to solve the above problems, and has an object of providing an LNG power plant and an operation method thereof, which are capable of securely achieving continuous operation even if the BOG generation ratio varies.

According to an aspect of the present invention, there is provided an LNG power plant comprising: (a) a gas turbine power generation unit having a gas turbine and a power generator; (b) an LNG vaporization facility configured to feed vaporized LNG as a fuel gas to the gas turbine power generation unit; (c) a gas feed pipe extended from the LNG vaporization facility to the gas turbine power generation unit; (d) a fuel gas heating/cooling device disposed between the LNG vaporization facility and the gas turbine unit on the gas feed pipe, configured to heat and cool the fuel gas introduced into the gas turbine power generation unit; (e) a plurality of heating value detectors configured to detect a heating value of the fuel gas; (f) a temperature detector attached on the gas feed pipe between the fuel gas heating/cooling device and the gas turbine unit configured to detect a temperature of the fuel gas; and (g) a temperature control device of the fuel gas heating/cooling device configured to control temperature of the fuel gas supplied to the gas turbine power generation unit, the temperature control device having: a target temperature calculator connected to the heating value detector configured to receive a heating value of the fuel gas and calculate a target temperature of the fuel gas introduced to the gas turbine power generation unit; and a command generator connected to the target temperature calculator and the fuel gas heating/cooling device configured to receive the target temperature and a signal of temperature of the fuel gas detected by the temperature detector and generate a command to control the fuel gas heating/cooling device by comparing the target temperature and the temperature of the fuel gas.

According to another aspect of the present invention, there is provided a fuel gas temperature control system for an LNG power plant having a gas turbine power generation unit having a gas turbine and a power generator, an LNG vaporization facility configured to feed vaporized LNG as a fuel gas to the gas turbine power generation unit, and a gas feed pipe extended from the LNG vaporization facility to the gas turbine power generation unit, the system comprising: (a) a fuel gas heating/cooling device disposed between the LNG vaporization facility and the gas turbine unit on the gas feed pipe, configured to heat and cool the fuel gas introduced into the gas turbine power generation unit; (b) a plurality of heating value detectors configured to detect a heating value of the fuel gas; (c) a temperature detector attached on the gas feed pipe between the fuel gas heating/cooling device and the gas turbine unit configured to detect a temperature of the fuel gas; and (d) a temperature control device of the fuel gas heating/cooling device configured to control temperature of the fuel gas supplied to the gas turbine power generation unit, the temperature control device having: a target temperature calculator connected to the heating value detector configured to receive a heating value of the fuel gas and calculate a target temperature of the fuel gas introduced to the gas turbine power generation unit; and a command generator connected to the target temperature calculator and the fuel gas heating/cooling device configured to receive the target temperature and a signal of temperature of the fuel gas detected by the temperature detector and generate a command to control the fuel gas heating/cooling device by comparing the target temperature and the temperature of the fuel gas.

According to yet another aspect of the present invention, there is provided a method of operating an LNG power plant, the method comprising: (a) detecting a heating value of a fuel gas supplied by an LNG vaporization facility; (b) generating a command to control the temperature of the fuel gas; (c) heating/cooling the fuel gas based on the command and the introducing the fuel gas to a gas turbine power generation unit; (d) detecting a temperature of the fuel gas introduced to the gas turbine power generation unit; and (e) calculating a target temperature of the fuel gas introduced to the gas turbine power generation unit based on the heating value; wherein the command is generated by comparing the temperature of the fuel gas with the target temperature.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

Hereinafter, embodiments of the present invention will be described with reference to the drawings.

First Embodiment

Figure 1:
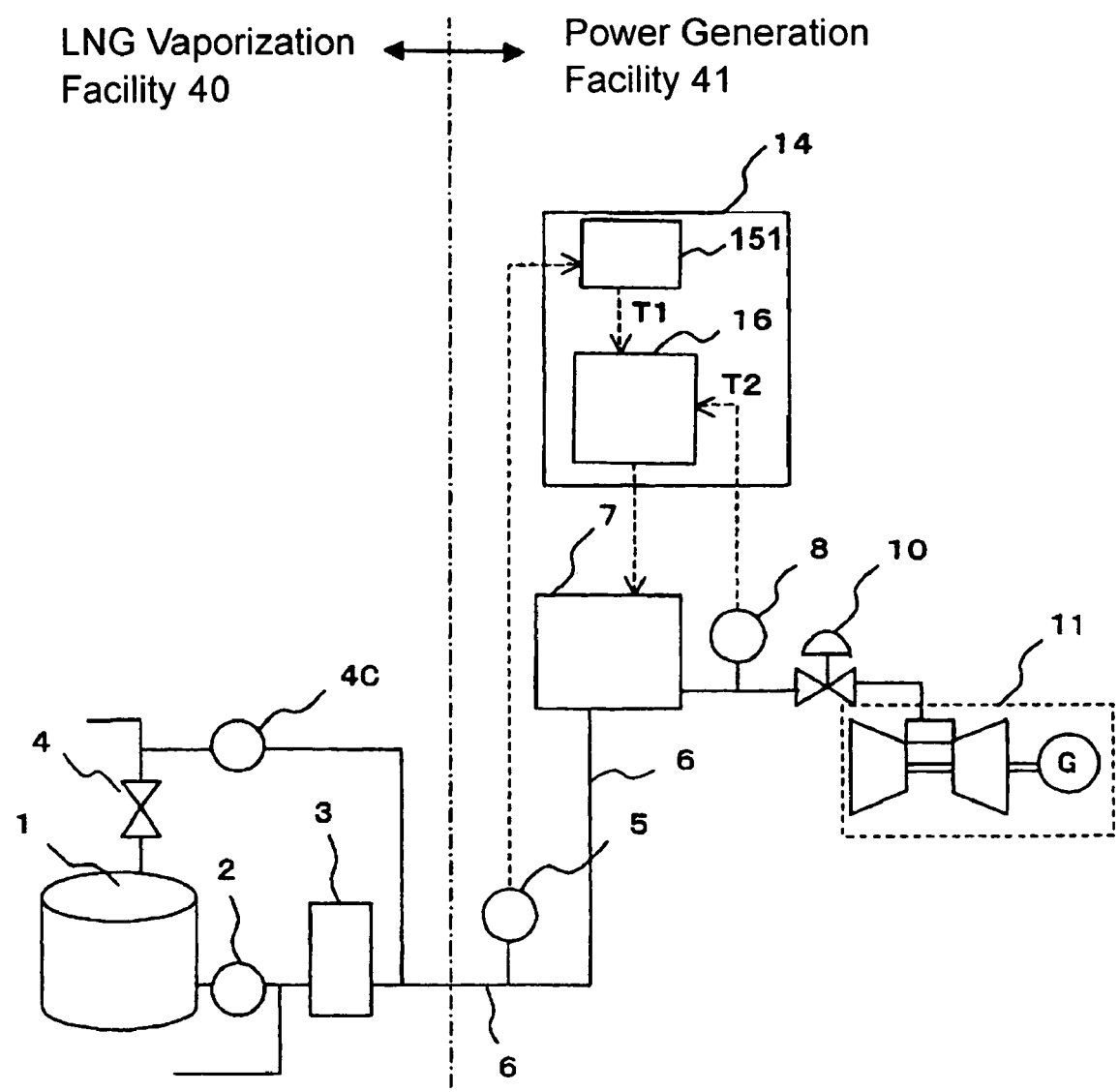
FIG. 1 is a block diagram of the LNG power plant according to the first embodiment of the present invention.

FIG. 1 is a block diagram of an LNG power plant according to the first embodiment of the present invention. The LNG power plant has an LNG vaporization facility 40 and a power generation facility 41.

The LNG vaporization facility 41 has a plurality of LNG storage tanks 1. The LNG storage tanks are thermally insulated. LNG storage tanks 1 are connected to a common BOG compressor 4C through respective BOG outlet valves 4. The LNG storage tanks 1 are also connected to a common vaporizer 3 through respective boost pumps 2. From the BOG compressor 4C and the vaporizer 3, a gas feed pipe 6 extends to the power generation facility 41.

In the power generation facility 41, the gas feed pipe 6 extends through a fuel adjust valve 10 to the gas turbine power generation unit 11. A heating value detector 5, such as a calorimeter or gas chromatography for detecting or calculating a gas heat generation quantity, is attached between the LNG vaporization facility 40 and the fuel adjust valve 10 on the gas feed pipe 6.

A gas heating/cooling device 7 is disposed on the gas feed pipe 6 between the heating value detector 5 and the fuel adjust valve 10. A temperature detector 8 is attached on the gas fed pipe 6 between the gas heating/cooling device 7 and the fuel adjust valve 10 to detect a temperature of the gas at the outlet of the gas heating/cooling device 7. A temperature control device 14 is connected the heating value detector 5, the temperature detector 8 and the gas heating/cooling device 7.

Figure 7:
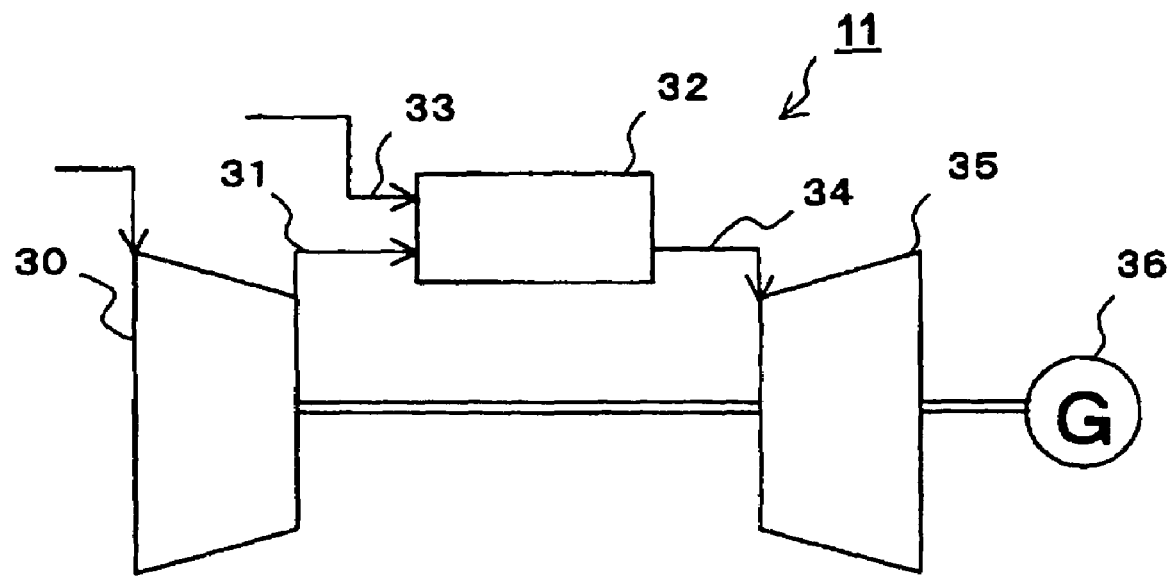
FIG. 7 is a block diagram of a typical gas turbine power generation unit.

FIG. 7 is a block diagram of a gas turbine power generation unit 11. In the gas turbine power generation unit 11, compressed air 31 compressed by a compressor 30 is mixed with fuel or vaporized LNG 33 in a combustor 32. The combustor 32 burns the fuel 33 to generate a combustion gas 34 having a high temperature and a high pressure. This combustion gas 34 is introduced into a gas turbine 35, to rotate a rotor. Rotation energy thereof is transmitted to a power generator 36 to generate electric power.

The LNG stored in the LNG storage tank 1 is pressurized by a boost pump 2 and fed to a vaporizer 3. The vaporizer 3 vaporizes the LNG.

The BOG generated in the LNG storage tank 1 is discharged from a BOG outlet valve 4 and sent to a BOG compressor 4C. If the LNG vaporization facility 40 has a plurality of LNG storage tanks 1, BOG from the LNG storage tanks 1 is collected and sent to the BOG compressor 4C. The BOG compressor 4C pressurizes the BOG. Thereafter, the BOG is mixed with the LNG outputted from the vaporizer 3 by a gas feed pipe 6, and fed to the power generation facility 41.

In the power generation facility 41, the fuel adjust valve 10 adjusts the flow rate of the fuel gas fed to the gas turbine power generation unit 11. A temperature detected by the temperature detector is sent to a temperature control device 14. With the temperature control device 14, it is possible to reduce additional facilities such as a flare facility for externally burning BOG or tanks for absorbing a flow rate of fuel gas.

The temperature control device 14 includes a target temperature calculator 151 and a command generator 16. The target temperature calculator 151 receives a signal from the heating value detector 5. As a heating value detector 5, a calorimeter for a fuel gas or a gas chromatography which detects an estimated heating value can be used. The target temperature calculator 151 then calculates and outputs a target temperature T1. The command generator 16 receives the signal of the target temperature T1 and a temperature signal detected by a temperature detector 8 attached at the outlet of the gas heating/cooling device 7, and outputs a control command to the gas heating/cooling device 7.

Figure 2:
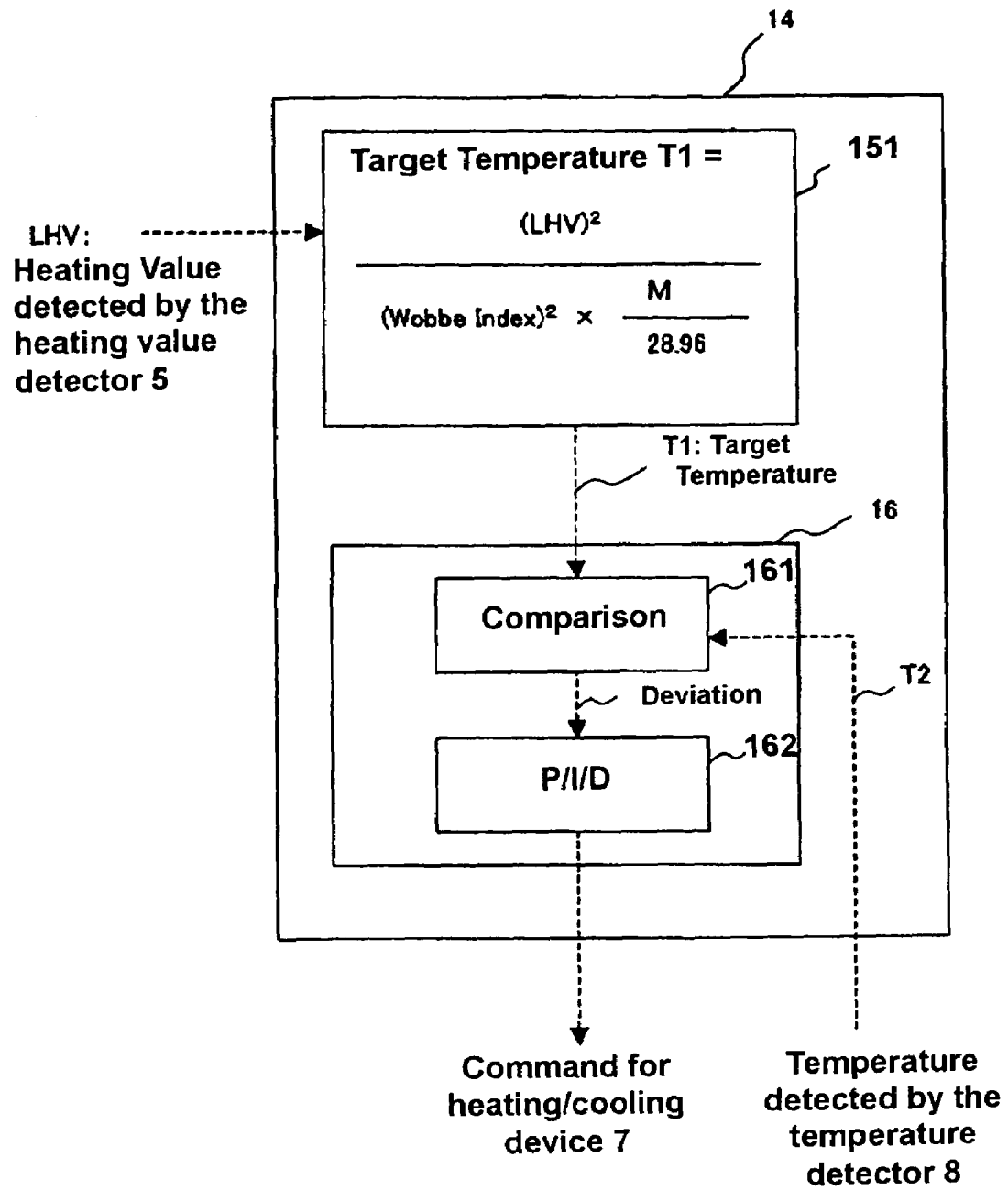
FIG. 2 is a block diagram of a temperature control device according to the first embodiment of the present invention.

FIG. 2 is a block diagram of the temperature control device 14. The target temperature calculator 151 receives a signal of a heating value, more specifically a lower heating value (LHV) from the heating value detector 5, and calculates the target temperature T1 by the expression (2) such that the Wobbe Index expressed by the expression (1) remain substantially constant. The temperature calculator 151 sends a signal of T1 to the command generator 16.

$$\text{Target temperature} = \frac{(LHV)^2}{(WI)^2 \times \frac{M}{28.96}} \quad (2)$$

Where WI is a target value of the Wobbe Index of the fuel gas, and

M is molecular weight of the fuel gas.

In the command generator 16, a comparator 161 compares the target temperature T1 with a temperature T2 detected by the temperature detector 8. A PID calculator 162 operates P (proportion)/I (integration)/D (differentiation) operation of the deviation between T1 and T2 and outputs an appropriate temperature control command to the gas heating/cooling device 7. Based on the temperature control command, the gas heating/cooling device 7 can make the Wobbe Index of the fuel gas as a mixture of BOG and LNG kept substantially constant.

As described above, the first embodiment of the LNG power plant sets the target temperature T1 at a gas outlet, based on the heat value of the fuel gas flowing through the gas feed pipe 6 in the LNG vaporization facility 40. The target temperature T1 is compared with the actual gas outlet temperature T2 at the outlet of the gas heating/cooling device 7, and the temperature is controlled so that the gas outlet temperature T2 is kept appropriate for the gas turbine power generation unit 11. Therefore, even if the fuel characteristics vary frequently due to changes in the BOG generation rate or if the BOG/LNG mixture ratio increases up to about 100%, the Wobbe Index can be kept in the limitation range (e.g., ±5%) by changing the target temperature T1. Accordingly, the LNG power plant can be continuously operated securely.

Second Embodiment

Figure 3:
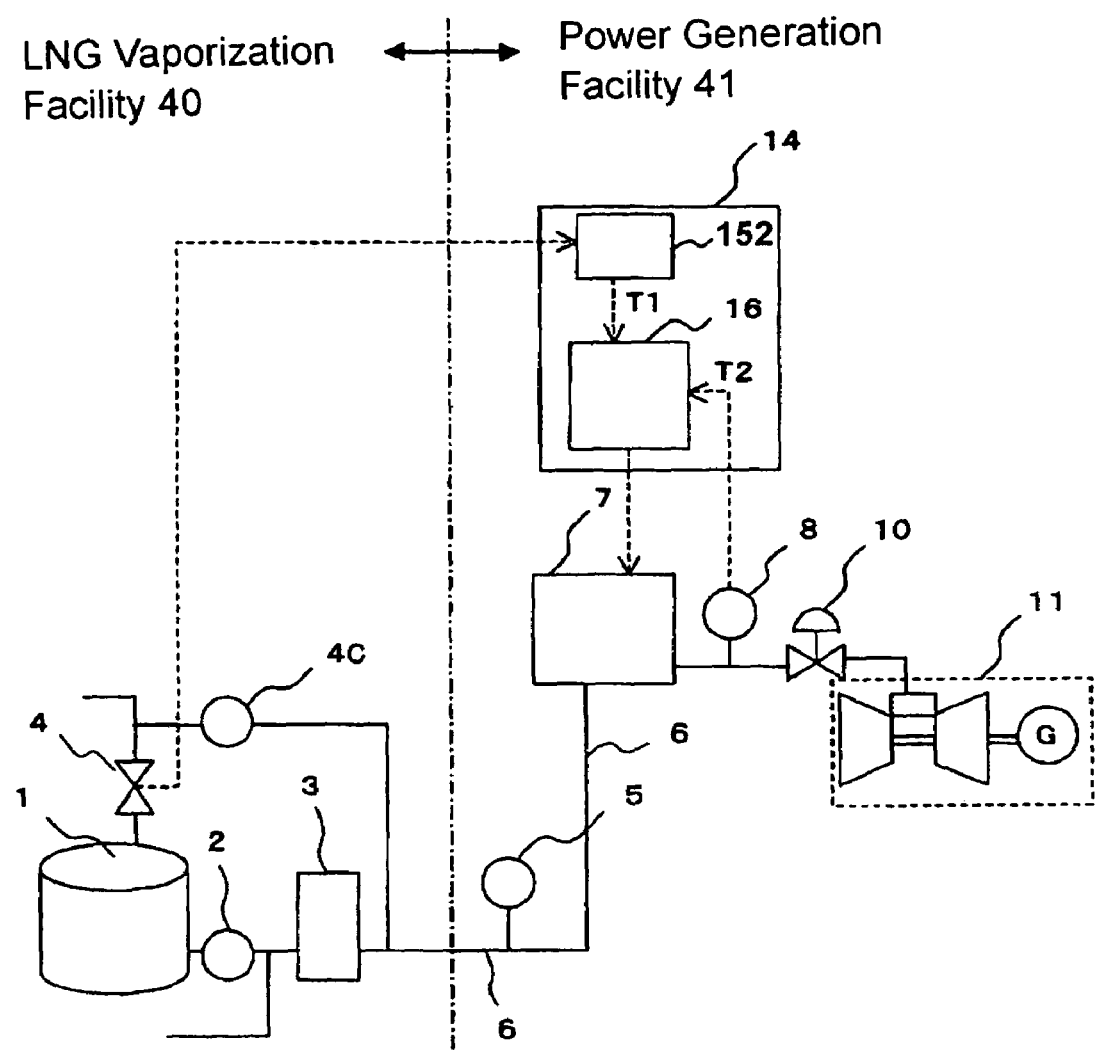
FIG. 3 is a block diagram of the LNG power plant according to the second embodiment of the present invention.

FIG. 3 is a block diagram of a LNG power plant according to the second embodiment of the present invention. As shown in FIG. 3, the present embodiment is partly different from the first embodiment in that the temperature control device 14 receives a signal from the BOG outlet valves 4 instead of the heating value detector 5.

A target temperature calculator 152 installed in the temperature control device 14 receives a signal indicating the number of open BOG outlet valves 4. This signal is used as a state quantity signal equivalent to the heating value in place of the heating value detected by the heating value detector 5. A signal of the number of the open BOG valves 4 is inputted to the target temperature calculator 152.

The other features of the structure are not different from those of the first embodiment shown in FIGS. 1, 2 and 7. The identical reference symbols are assigned and detailed descriptions thereof is omitted here.

In the LNG power plant according to the present embodiment, a signal of the number of the open BOG outlet valves 4 is sent to the target temperature calculator 152. Based on the number of the open BOG outlet valves 4, the target temperature calculator 152 calculates the target temperature T1 appropriate for the power generation facility 41 and sends a signal of T1 to the command generator 16.

The command generator 16 compares the target temperature T1 obtained through the calculation by the target temperature calculator 152 with the actual gas outlet temperature T2 at the outlet of the gas heating/cooling device 7. A PID calculator 162 (shown in FIG. 2) in the command generator 16 operates P (proportion)/I (integration)/D (differentiation) operation of the deviation between T1 and T2 and outputs an appropriate temperature control command to the gas heating/cooling device 7. Based on the temperature control command, the gas heating/cooling device 7 can make the Wobbe Index of the fuel gas as a mixture of BOG and LNG kept substantially constant.

As has been described above, the LNG power plant sets T1 as the target temperature of the fuel gas at the gas outlet, based on the number of the open BOG outlet valves 4 as the state quantity signal equivalent to a detected heating value in the expression concerning the Wobbe Index. The obtained target temperature T1 and the actual gas outlet temperature T2 at the outlet of the gas heating/cooling device 7 are compared with each other by the comparator 161. The temperature is controlled so that the gas outlet temperature T2 is kept appropriate for the gas turbine power generation unit 11. Therefore, even if the fuel characteristics vary frequently due to changes in the BOG generation rate or if the BOG/LNG mixture ratio increases up to about 100%, the Wobbe Index can be kept in the limitation range (e.g., ±5%) by changing the target temperature T1. Accordingly, the LNG power plant can be continuously securely operated.

Third Embodiment

Figure 4:
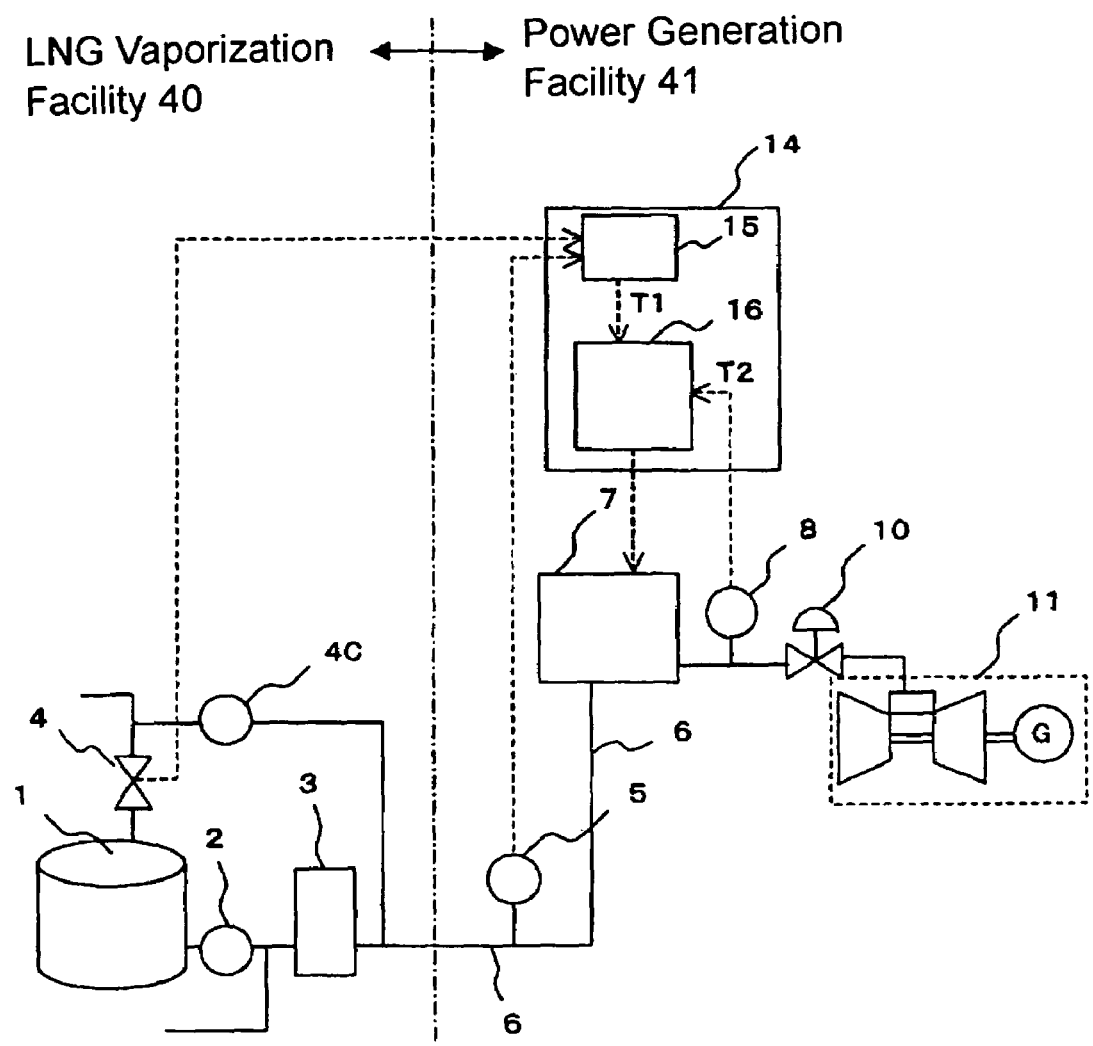
FIG. 4 is a block diagram of the LNG power plant according to the third embodiment of the present invention.
Figure 5:
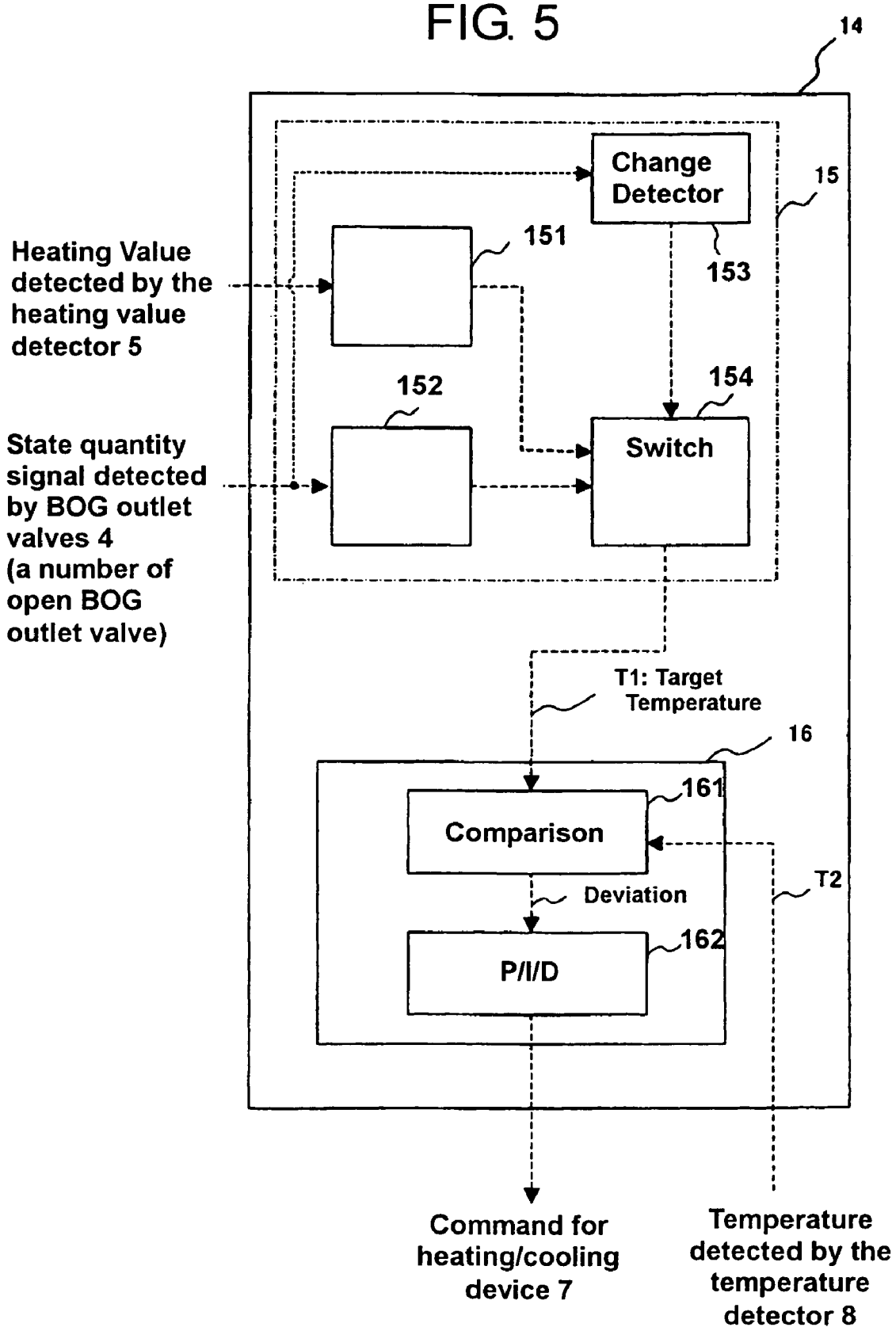
FIG. 5 is a block diagram of a temperature control device according to the third embodiment of the present invention.

FIG. 4 is a block diagram of the LNG power plant according to the third embodiment of the present invention. FIG. 5 is a block diagram of a temperature control device used in the present embodiment.

If the number of the operated BOG outlet valves 4 is changed in the LNG vaporization facility 40, a change of the heating value of the fuel gas has a small delay from the change of the number of the operated BOG outlet valves.

Therefore, if a detection signal from the heating value detector 5 such as a gas calorimeter or a gas chromatography is introduced to the temperature control device 14, as in the first embodiment, the response speed can be lower but the accuracy can be higher, compared with the case in which a signal indicating the number of the operating BOG outlet valves 4 is introduced to the temperature control device 14, as in the second embodiment.

Inversely, if the operating BOG outlet valve number signal is introduced to the temperature control device 14, as in the second embodiment, the accuracy is more or less low but the response speed is higher compared with the case where a detection signal from the heating value detector 5 such as a gas calorimeter or a gas chromatography is introduced to the temperature control device 14.

Hence, the present embodiment has been designed to obtain a temperature control device 14 which utilizes the feature of the high accuracy of the first embodiment and the other feature of the high response speed of the second embodiment.

In the present embodiment, a target temperature calculation unit 15 is used in place of the target temperature calculator 151 of the first embodiment or the target temperature calculator 152 of the second embodiment.

In FIG. 5, a detection signal from the heating value detector 5 is sent to the first target temperature calculator 151. A number of the open BOG outlet valve 4 as a state quantity signal equivalent to a heating value detected by the BOG outlet valve 4 is sent to the second target temperature calculator 152. The target temperature calculators 151 and 152 each calculate a target temperature T1. How these target temperature calculators 151 and 152 calculate the target temperature T1 by the expression (2) so that the Wobbe Index expressed by the expression (1) remains substantially constant, has already been described in the first and second embodiments.

Numeral "153" in FIG. 5 denotes a change detector for detecting a change in the number of the open BOG outlet valves 4. When the number of the open BOG outlet valves 4 changes, the change detector 153 detects this change and sends a switch signal to a switch 154 in order to make the calculation result of the second target temperature calculator 152 be sent to the command generator 16. After a specific time period (a pre-set time period) described later elapses after the change of the number of open BOG outlet valves 4, the change detector 153 gives the switch 154 a return signal (or an operation cancel signal), to make the calculation result of the first target temperature calculator 151 be sent to the command generator 16, in place of the calculation result of the second target temperature calculator 152.

The pre-set time period of the change detector 153 is set as follows. That is, the heating value of the fuel gas starts changing with a slight delay of the number of the open outlet valves 4, and then becomes a stable value. Considering the time period when the quantity becomes a stable value, the pre-set time period of the change detector 153 is set.

Suppose now that the number of open BOG outlet valves 4 has changed. Then, the signal of the number of the open BOG outlet valves 4 changes immediately. Therefore, the change detector 153 immediately works and the second target temperature calculator 152 calculates, by use of the expression (2), the target temperature T1 of the fuel gas optimal for the gas turbine power generation unit 11 such that the Wobbe Index shown in the expression (1) is kept substantially constant. The change detector 153 outputs the value to the command generator 16.

After the pre-set time period elapses after the change of number of the open BOG outlet valves 4, the change detector 153 gives return signal to the command generator 16. And the switch 154 sends the calculation result of the first target temperature calculator 151 based on the detection signal from the heating value detector 5, in place of the calculation result of the second target temperature calculator 152.

Immediately after the change of the number of the open BOG outlet valves 4, the command generator 16 compares the target temperature T1 outputted by the second target temperature calculator 152 with the actual gas outlet temperature T2 at the outlet of the gas heating/cooling device 7 detected by the temperature detector 8. The command generator 16 controls the gas outlet temperature by controlling the gas heating/cooling device 7 such that the gas outlet temperature is substantially equal to the target temperature T1. After the pre-set time period of the change detector 153, the command generator 16 compares the target temperature T1 outputted by the first target temperature calculator 151 with the actual gas outlet temperature T2 at the outlet of the gas heating/cooling device 7 detected by the temperature detector 8. The command generator 16 controls the gas outlet temperature by controlling the gas heating/cooling device 7 such that the gas outlet temperature is substantially equal to the target temperature T1.

As described above, in the LNG power plant according to the third embodiment of the present invention, the heating value signal of the fuel gas flowing through a feed pipe in the LNG vaporization facility 40, and the signal of the number of open BOG outlet valves as a status signal equivalent to the heating value is inputted to the temperature control device 14. If the number of the open BOG outlet valves 4 changes, the target temperature T1 obtained on the basis of the number of the open BOG outlet valves 4 is firstly outputted to the command generator 16. After elapse of the pre-set time period set previously, another target temperature T1 obtained on the basis of the heating value signal is outputted to the command generator 16. Therefore, the temperature control device 14 responds very quickly to changes in the number of open BOG outlet valves and has high accuracy.

As a result, Therefore, even if the fuel characteristics vary frequently due to changes in the BOG generation rate or if the BOG/LNG mixture ratio increases up to about 100%, the Wobbe Index can be kept in the limitation range (e.g., ±5%) by changing the target temperature, like in the previous embodiments. Accordingly, the LNG power plant can be continuously securely operated.

In the present embodiment, the target temperature calculation unit 15 firstly lets the calculation result of the second target temperature calculator 152 be outputted by the change detector 153, if the number of the open BOG outlet valves 4 changes. After a pre-set time period, the calculation result of the first target temperature calculator 151 is outputted by the switch 154.

However, the present embodiment may be modified as follows. That is, in place of switching the calculation results, the inputs of the first target temperature calculator 151 and the second target temperature calculator 152 may be switched from each other, to make only one of the target temperature calculators selected by the change detector 153 calculate the target temperature T1. For example, if the change detector 153 detects a change in the number of open BOG outlet valves, only the second target temperature calculator 152 calculates the target temperature T1 and output a calculation result to the command generator 16. After the pre-set time period of the change detector 153, only the first target temperature calculator 151 calculates the target temperature T1 and output a calculation result to the command generator 16.

Fourth Embodiment

Figure 6:
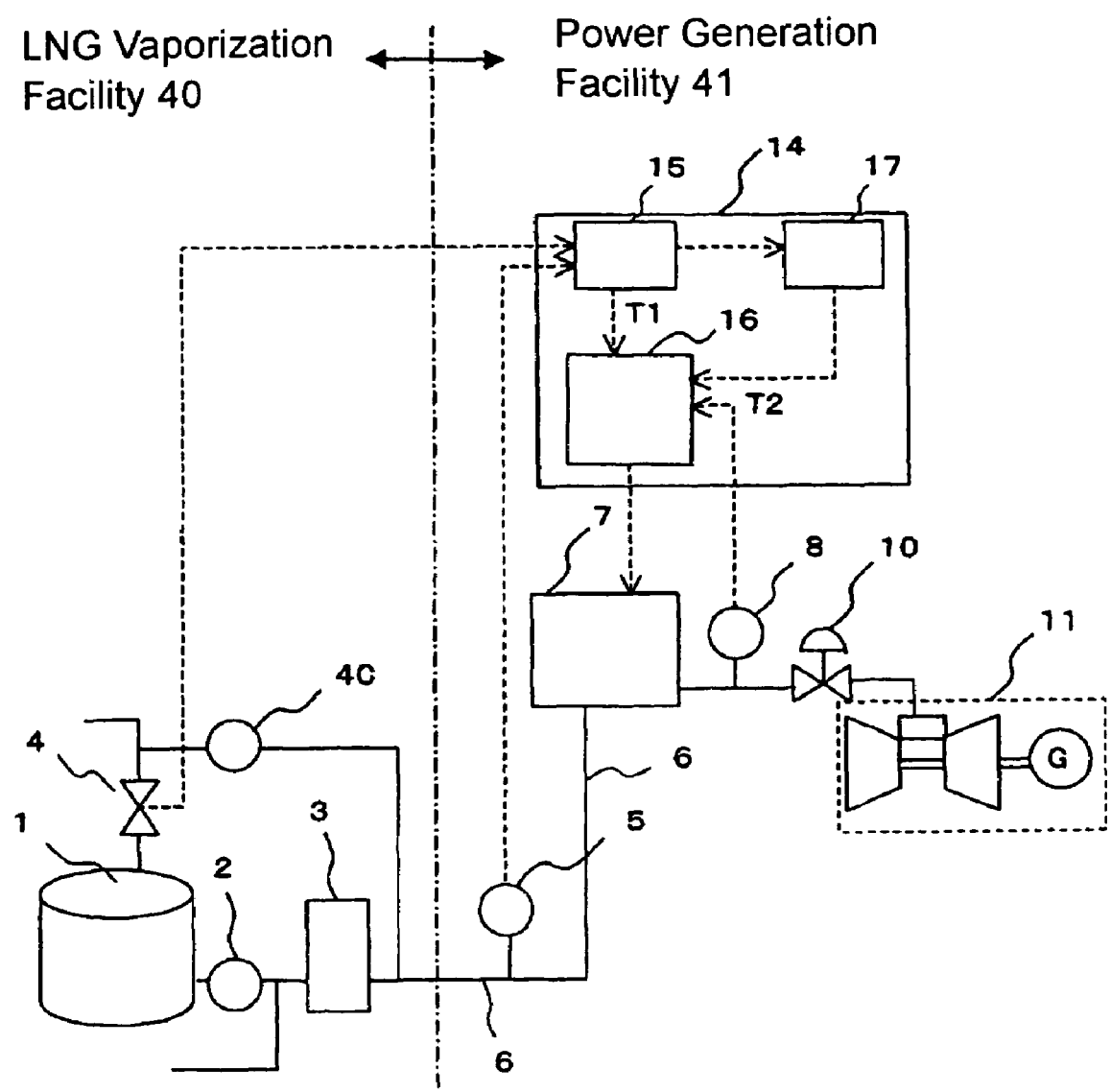
FIG. 6 is a block diagram of the LNG power plant according to the fourth embodiment of the present invention.

FIG. 6 is a block diagram of an LNG power plant according to the fourth embodiment of the present invention. The present embodiment is an expansion of the third embodiment. As shown in FIG. 6, a dynamic characteristic model 17 of the heating value detector 5 is installed in the temperature control device 14.

The dynamic characteristic model 17 generates an advance control signal (feed forward signal) based on the signal of the number of the open BOG outlet valves 4. The command generator 16 receives this feed forward signal as a correction signal. Therefore, if a delay in detection caused when a heating value signal and a status signal (the number of the open BOG outlet valves) equivalent to the heating value (a primary delay and a dead time) are combined, the delay can be compensated for. Thus, the target temperature T1 can be obtained at a high response speed with excellent accuracy.

Therefore, the command generator 16 can compare the target temperature T1 with the actual gas outlet temperature T2 at the outlet of the gas heating/cooling device 7 and perform temperature control such that the gas outlet temperature is an optimal temperature for the gas turbine power generation device 11. Therefore, even if the fuel characteristics vary frequently due to changes in the BOG generation rate or if the BOG/LNG mixture ratio increases up to about 100%, the Wobbe Index can be kept in the limitation range (e.g., ±5%) by changing the target temperature. Accordingly, the LNG power plant can be continuously securely operated.

Also, the advance control signal generated by the dynamic characteristic model 17 is sent to the command generator 16 as a correction signal. Therefore, the temperature can be controlled in advance. Further, the fuel index of the fuel gas can be kept in the limitation range with higher accuracy over a wide range.

In each of the embodiments described above, the gas turbine power generation unit 11 is not limited to a simple gas turbine power generation facility but may be a combined cycle power plant or another plant which includes both a combined cycle power plant and a water generation plant.

Numerous modifications and variation of the present invention are possible in light of the above teachings. It is, therefore, to be understood that, within the scope of the appended claims, the present invention can be practiced in a manner other than as specifically described herein.

What is claimed is:
1. An LNG power plant comprising:
(a) a gas turbine power generation unit having a gas turbine and a power generator;
(b) an LNG vaporization facility configured to feed vaporized LNG as a fuel gas to the gas turbine power generation unit;
(c) a gas feed pipe extended from the LNG vaporization facility to the gas turbine power generation unit;
(d) a fuel gas heating/cooling device disposed between the LNG vaporization facility and the gas turbine power generation unit on the gas feed pipe, configured to heat and cool fuel gas introduced into the gas turbine power generation unit;
(e) a heating value detector configured to detect a heating value of the fuel gas;
(f) a temperature detector attached on the gas feed pipe between the fuel gas heating/cooling device and the gas turbine power generation unit configured to detect a temperature of the fuel gas; and
(g) a temperature control device of the fuel gas heating/cooling device configured to control temperature of the fuel gas supplied to the gas turbine power generation unit, the temperature control device having:
a target temperature calculator connected to the heating value detector configured to receive a heating value of the fuel gas and calculate a target temperature of the fuel gas introduced to the gas turbine power generation unit; and
a command generator connected to the target temperature calculator and the fuel gas heating/cooling device configured to receive the target temperature and a signal of temperature of the fuel gas detected by the temperature detector and generate a command to control the fuel gas heating/cooling device by comparing the target temperature and the temperature of the fuel gas.

2. The LNG power plant of claim 1, wherein the heating value detector is a calorimeter attached on the gas feed pipe between the LNG vaporization facility and the fuel gas heating/cooling device.

3. The LNG power plant of claim 1, wherein the heating value detector is a gas chromatograph attached on the gas feed pipe between the LNG vaporization facility and the fuel gas heating/cooling device.

4. The LNG power plant of claim 1, wherein the heating value detector is a device for detecting a status of the LNG vaporization facility and calculating a value equivalent to the heating value of the fuel gas.

5. The LNG power plant of claim 1, wherein the heating value detector includes a first heating value detector and a second heating value detector, wherein the first heating value detector is a device for detecting a status of the LNG vaporization facility and calculating a value equivalent to the heating value of the fuel gas, wherein the second heating value detector is a device attached on the gas feed pipe between the LNG vaporization facility and the fuel gas heating/cooling device and wherein the target temperature calculator is configured to receive a signal of the heating values detected by the first and the second heating value detectors.

6. The LNG power plant of claim 5, wherein the command generator has a dynamic characteristic model of the second heating value detector.

7. The LNG power plant of claim 6, wherein the command generator is configured to correct a delay of a signal from the second heating value detector by a dynamic characteristic model with a signal from the first heating value detector.

8. A fuel gas temperature control system for an LNG power plant having a gas turbine power generation unit having a gas turbine and a power generator, an LNG vaporization facility configured to feed vaporized LNG as a fuel gas to the gas turbine power generation unit, and a gas feed pipe extended from the LNG vaporization facility to the gas turbine power generation unit, the system comprising:
(a) a fuel gas heating/cooling device disposed between the LNG vaporization facility and the gas turbine power generation unit on the gas feed pipe, configured to heat and cool the fuel gas introduced into the gas turbine power generation unit;
(b) a heating value detector configured to detect a heating value of the fuel gas;
(c) a temperature detector attached on the gas feed pipe between the fuel gas heating/cooling device and the gas turbine power generation unit configured to detect a temperature of the fuel gas; and (d) a temperature control device of the fuel gas heating/cooling device configured to control temperature of the fuel gas supplied to the gas turbine power generation unit, the temperature control device having:

a target temperature calculator connected to the heating value detector configured to receive a heating value of the fuel gas and calculate a target temperature of the fuel gas introduced to the gas turbine power generation unit; and a command generator connected to the target temperature calculator and the fuel gas heating/cooling device configured to receive the target temperature and a signal of temperature of the fuel gas detected by the temperature detector and generate a command to control the fuel gas heating/cooling device by comparing the target temperature and the temperature of the fuel gas.

* * * * *